(12) United States Patent
Yamada et al.

(10) Patent No.: US 7,764,739 B2
(45) Date of Patent: Jul. 27, 2010

(54) MOVING PICTURE ENCODING DEVICE AND METHOD WITH TIME CONSTRAINT

(75) Inventors: Takahiro Yamada, Osaka (JP); Kazuyuki Inokuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 1210 days.

(21) Appl. No.: 11/003,486

(22) Filed: Dec. 6, 2004

(65) Prior Publication Data
US 2005/0180504 A1    Aug. 18, 2005

(30) Foreign Application Priority Data
Feb. 13, 2004   (JP) .............................. 2004-036891

(51) Int. Cl.
*H04N 7/12* (2006.01)
(52) U.S. Cl. ................................. 375/240.12
(58) Field of Classification Search ............ 375/240.12, 375/240.24, 240.26
See application file for complete search history.

(56) References Cited

U.S. PATENT DOCUMENTS

| 5,010,401 A | 4/1991 | Murakami et al. |
| 5,808,700 A | 9/1998 | Sugimoto et al. |
| 7,239,721 B1* | 7/2007 | Kumar et al. ............... 382/107 |
| 2002/0041699 A1* | 4/2002 | Kim ........................... 382/107 |

FOREIGN PATENT DOCUMENTS

JP    11-55677    2/1999

* cited by examiner

*Primary Examiner*—Y. Lee
*Assistant Examiner*—Richard Torrente
(74) *Attorney, Agent, or Firm*—McDermott Will & Emery LLP

(57) ABSTRACT

A motion vector detection section detects as a reference macroblock a reference pixel block with which a sum of differences in pixel data between a target macroblock and each pixel is equal to or smaller than a predetermined threshold among macroblocks in a reference frame. An intraframe time management section measures a detection time. If an allocated predetermined detection time has elapsed before detection of such a reference macroblock, the detection processing is stopped. In this case, a macroblock with which the previously-calculated sum is minimum is selected as a reference macroblock.

21 Claims, 15 Drawing Sheets

MOVING PICTURE ENCODING DEVICE AND METHOD WITH TIME CONSTRAINT

CROSS-REFERENCE TO RELATED APPLICATION

This application claims priority under 35 U.S.C. §119(a) on Japanese Patent Application No. 2004-36891 filed on Feb. 13, 2004, the entire contents of which are hereby incorporated by reference.

BACKGROUND OF THE INVENTION

The present invention relates to a moving picture encoder device and moving picture encoding method for compressing moving picture data on a real time basis, which are applicable to a digital still camera (DSC) having the function of storing moving picture data, e.g., moving picture capturing function, a mobile camera phone having a moving picture capturing function, etc.

The encoding process of moving picture data is generally performed by the units of a plurality of pixel data pieces included in a rectangular region called macroblock, i.e., on a macroblock by macroblock basis. The encoding process is performed on the difference in the pixel data between a macroblock to be processed (target macroblock) and a reference macroblock included in a previous frame in order to increase the data compression rate.

The reference macroblock is obtained through the motion vector detection process. Specifically, the sum of the differences in corresponding pixel data between a target macroblock and each of the macroblocks neighboring the position corresponding to the target macroblock in a previous frame, and a macroblock of the minimum sum is selected as a reference macroblock. As the number of macroblocks to be searched becomes larger, i.e., as the number of search operations increases, the possibility of selecting an appropriate macroblock becomes higher, and accordingly, the amount of encoded image data is suppressed to be small. Thus, a method for adaptively controlling the range of search according to the properties of images, etc., has conventionally been known. As the search range is extended, the amount of arithmetic operations increases. The technique of keeping the amount of arithmetic operations substantially constant while suppressing the decrease in the encoding efficiency by adopting a skip search mode or changing the resolution of the objects to be searched has also been known (e.g., Japanese Unexamined Patent Publication No. 11-55677).

However, it is not always easy to appropriately set the range of search. Therefore, in the above conventional techniques, it is impossible to surely suppress the decrease in the encoding efficiency.

Herein, it is possible to consider searching for a reference macroblock with which the sum of differences of pixel data is equal to or smaller than a predetermined threshold instead of searching for a macroblock with which the sum of differences is minimum within a predetermined search range. In such a case, if the motion of an image is larger than expected, a very long span of time is consumed till an intended reference macroblock is found. As a result, the encoding process is not completed within one frame cycle, and accordingly, a so-called frame dropout occurs.

SUMMARY OF THE INVENTION

The present invention was conceived in view of the above problems. An objective of the present invention is to provide a moving picture encoder device and moving picture encoding method wherein an encoding process is surely completed within a predetermined time period, and an appropriate reference macroblock is selected, whereby the encoding efficiency is improved.

In order to achieve the above objective, the first moving picture encoder device of the present invention is a moving picture encoder device for encoding moving picture data based on a difference in pixel data in a pixel block between frames, comprising: search means for searching for a reference pixel block with which a sum of differences between corresponding pixel data is smaller than a predetermined threshold from among pixel blocks in a reference frame on a target pixel block by target pixel block basis in a target frame; search time setting means for setting an allocation time which is to be allocated to the search among the target pixel blocks by the search means; and search time controlling means for stopping the search at the time when the time consumed by the search of the search means reaches the allocation time, wherein when the search is stopped by the search time controlling means, the search means selects a pixel block with which the sum of the differences is minimum from among the previously searched pixel blocks as a reference pixel block of a search result, and when a reference pixel block with which the sum of the differences is smaller than the predetermined threshold is found before the end of the allocation time, the search time setting means allocates a difference between the allocation time and the time consumed by the search to a search as to another target pixel block.

With the above structure, the search operation is stopped at a predetermined time even if a reference pixel block with which the sum of differences in the pixel data is smaller that a threshold is not found. Thus, the encoding process is surely completed within a predetermined time. Further, if there is a target pixel block in which the search has been completed before the end of the allocated time, a search time for another target pixel block becomes longer. Thus, the possibility of obtaining a more appropriate reference pixel block is increased.

The second moving picture encoder device of the present invention is based on the first moving picture encoder device and further comprises motion prediction means for predicting the largeness of motion of an image on a target pixel block by target pixel block basis, wherein the search time setting means sets the allocation time for each target pixel block according to the predicted largeness of motion.

The third moving picture encoder device of the present invention is based on the second moving picture encoder device, wherein: the motion prediction means obtains a difference between the sum of pixel data in a target pixel block or a motion prediction pixel block having a predetermined size which corresponds to the target pixel block and the sum of pixel data in a pixel block in a reference frame which resides at a position corresponding to the target pixel block or the motion prediction pixel block as a motion prediction value which indicates the largeness of the motion; and the search time setting means sets a time allocated to a target pixel block in which the prediction value is large to be longer than that allocated to a target pixel block in which the prediction value is small.

The fourth moving picture encoder device of the present invention is based on the third moving picture encoder device, wherein the search time setting means sets a time allocated to a target pixel block in which the motion prediction value is greater than a predetermined threshold to be longer than that allocated to a target pixel block in which the motion prediction value is smaller than the predetermined threshold.

The fifth moving picture encoder device of the present invention is based on the first moving picture encoder device and further comprises spatial frequency component calculation means for calculating the value of a predetermined spatial frequency component in each target pixel block or a spatial frequency component calculation pixel block having a predetermined size which corresponds to the target pixel block, wherein the search time setting means sets an allocation time which is to be allocated to each target pixel block according to the value of the predetermined spatial frequency component.

The sixth moving picture encoder device of the present invention is based on the fifth moving picture encoder device, wherein the search time setting means sets a time allocated to a target pixel block in which the value of a predetermined high spatial frequency component is large to be longer than that allocated to a target pixel block in which the value of the predetermined high spatial frequency component is small.

The seventh moving picture encoder device of the present invention is based on the sixth moving picture encoder device, wherein the search time setting means sets a time allocated to a target pixel block in which the value of the high spatial frequency component is greater than a predetermined threshold to be longer than that allocated to a target pixel block in which the value of the high spatial frequency component is smaller than the predetermined threshold.

With the above features, the search time becomes long according to the largeness of motion of an image or the value of a predetermined spatial frequency component. For example, a longer time is allocated to a pixel block of a larger motion or a pixel block in which the value of the high spatial frequency component is large. As a result, the possibility of obtaining a more appropriate reference pixel block is increased.

The eighth moving picture encoder device of the present invention is based on the first moving picture encoder device and further comprises pixel block position determination means for determining a target pixel block of a perimeter portion and a target pixel block of a central portion in the target frame, wherein the search time setting means sets a time allocated to the target pixel block of the central portion to be longer than that allocated to the target pixel block of the perimeter portion.

The ninth moving picture encoder device of the present invention is based on the first moving picture encoder device and further comprises significance determination means for determining the significance of a target pixel block in a target frame, wherein the search time setting means sets a time allocated to a target pixel block of higher significance to be longer than that allocated to a target pixel block of lower significance.

Also with the above features, the possibility of obtaining an appropriate reference pixel block according to the significance of a target pixel block, or the like, is increased.

The first moving picture encoding method of the present invention is a moving picture encoding method for encoding moving picture data based on a difference in pixel data in a pixel block between frames, comprising: a search step of searching for a reference pixel block with which a sum of differences between corresponding pixel data is smaller than a predetermined threshold from among pixel blocks in a reference frame on a target pixel block by target pixel block basis in a target frame; a search time setting step of setting an allocation time which is to be allocated to the search among the target pixel blocks at the search step; and a search time controlling step of stopping the search at the time when the time consumed by the search at the search step reaches the allocation time, wherein when the search is stopped at the search time controlling step, the search step includes the step of selecting a pixel block with which the sum of the differences is minimum from among the previously searched pixel blocks as a reference pixel block of a search result, and when a reference pixel block with which the sum of the differences is smaller than the predetermined threshold is found before the end of the allocation time, the search time setting step includes the step of allocating a difference between the allocation time and the time consumed by the search to a search as to another target pixel block.

Also with the above method, the search operation is stopped at a predetermined time even if a reference pixel block with which the sum of differences in the pixel data is smaller that a threshold is not found. Thus, the encoding process is surely completed within a predetermined time. Further, if there is a target pixel block in which the search has been completed before the end of the allocated time, a search time for another target pixel block becomes longer. Thus, the possibility of obtaining a more appropriate reference pixel block is increased.

DESCRIPTION OF THE PREFERRED EMBODIMENTS

Hereinafter, embodiments of the present invention will be described with reference to the drawings.

Embodiment 1

In a moving picture encoder device of embodiment 1, the encoding process of moving picture data is performed by the units of a plurality of pixel data pieces included in a rectangular region called macroblock (pixel block), i.e., on a macroblock by macroblock basis. Further, in the above encoding process, interframe predictive coding is performed in order to decrease the amount of codes. Specifically, the encoding process is performed on the difference in the pixel data between a macroblock to be processed (target macroblock) which is included in a frame to be encoded (target frame) and a reference macroblock included in a previous frame in order to increase the data compression rate. It should be noted that intraframe coding is performed in the first frame because the first frame has no reference frame.

Figure 1:
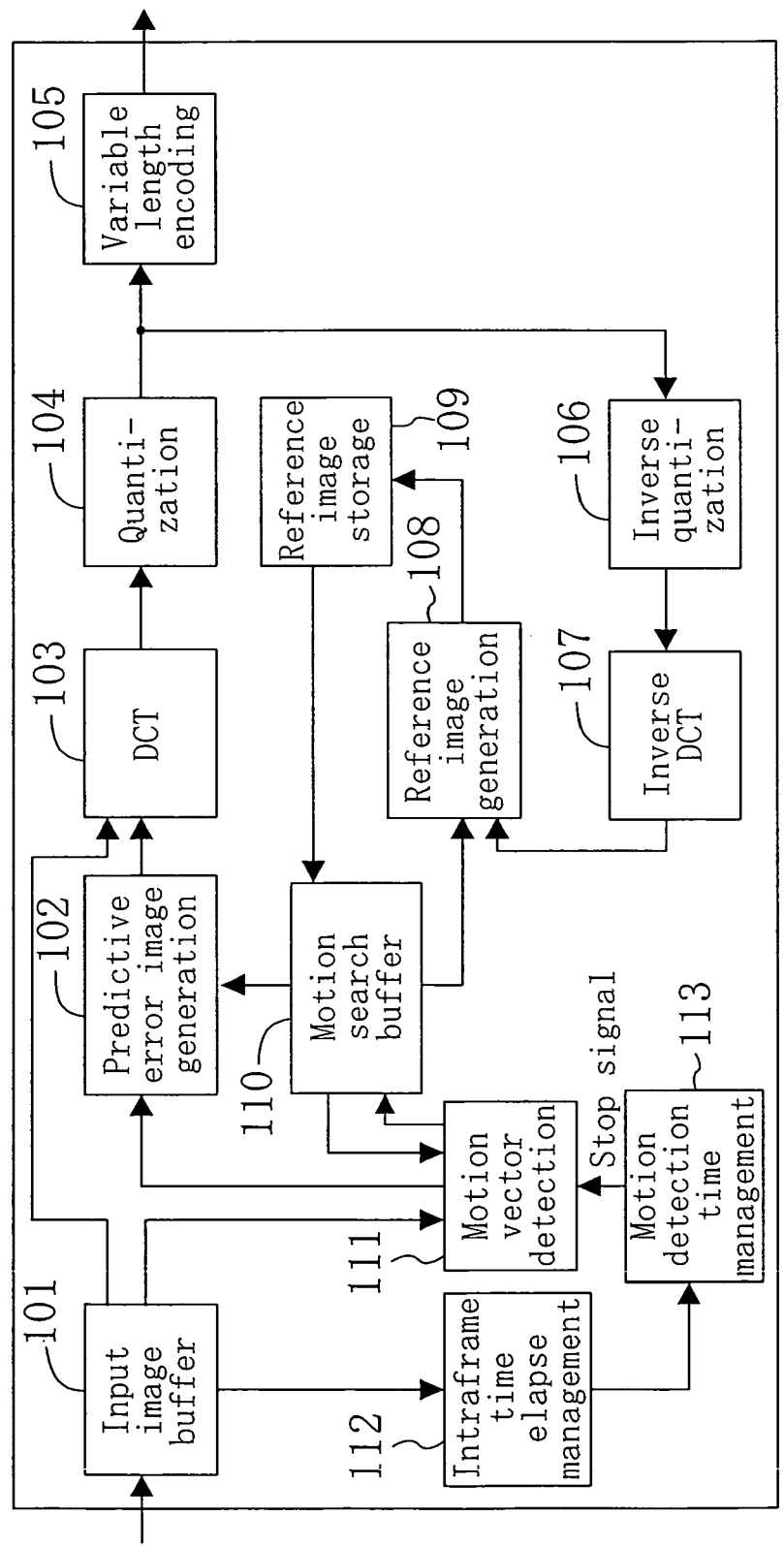
FIG. 1 is a block diagram showing the structure of a moving picture encoder device according to embodiment 1.

Referring to FIG. 1, the moving picture encoder device of embodiment 1 includes, for example, an input image buffer 101, a predictive error image generation section 102, a DCT (discrete cosine transformation) processing section 103, a quantization section 104, a variable length encoding section 105, an inverse quantization section 106, an inverse DCT processing section 107, a reference image generation section 108, a reference image storage section 109, a buffer 110 for motion search (motion search buffer 110), a motion vector detection section 111, an intraframe time elapse management section 112 and a motion detection time management section 113.

The input image buffer 101 temporarily stores image data input from a solid state imaging device, or the like, which is outside the moving picture encoder device, on a pixel by pixel basis, specifically, for example, brightness data and color difference data.

In the case where encoding of the second and subsequent frames is performed, the predictive error image generation section 102 obtains a difference between pixel data of each pixel of a target macroblock input from the input image buffer 101 through the motion vector detection section 111 and pixel data of each pixel of a reference macroblock input from the motion search buffer 110 to generate predictive error image data. There reference macroblock is a macroblock residing at a position shifted from a position corresponding to the target macroblock in the reference frame by a motion vector obtained by the motion vector detection section 111 as will be described later.

The DCT processing section 103 and the quantization section 104 performs transformation to a spatial frequency component and quantization processing on image data input from the input image buffer 101 (first frame) or predictive error image data input from the predictive error image generation section 102 (second and subsequent frames). The image data output from the quantization section 104 is input to the variable length encoding section 105 and the inverse quantization section 106.

The variable length encoding section 105 performs variable length encoding processing, i.e., removes redundant information to generate encoded data having a reduced amount of information. This encoded data is recorded in a recording medium by a recording section (not shown).

The inverse quantization section 106 and the inverse DCT processing section 107 performs inverse quantization processing and inverse DCT processing on image data output from the quantization section 104.

As for the first frame, the reference image generation section 108 outputs image data received from the inverse DCT processing section 107 as it is. As for the second and subsequent frames, the reference image generation section 108 receives predictive error image data from the inverse DCT processing section 107. Therefore the reference image generation section 108 adds the predictive error image data to image data of a previous reference frame which is stored in the motion search buffer 110 to restore image data of the current frame, and the restored image data is output from the reference image generation section 108.

The reference image storage section 109 stores image data output from the reference image generation section 108 as image data of a reference frame for the process of the next frame. This storage is performed for a region corresponding to the position of each target macroblock.

The motion search buffer 110 stores image data stored in the reference image storage section 109 for generation of predictive error image data in the predictive error image generation section 102.

The motion vector detection section 111 obtains a reference macroblock with which the effect of decreasing the amount of information due to predictive coding is increased. Specifically, the motion vector detection section 111 obtains the sum of the differences in pixel data between pixels of a target macroblock and pixels of a macroblock included in a reference frame and selects a reference macroblock in which the sum is equal to or smaller than a predetermined threshold or minimum. The motion vector detection section 111 then obtains a motion vector which indicates a relative positional relationship between the selected reference macroblock and the target macroblock. It should be noted that, for example, the motion vector is generated based on the brightness data, and the generated motion vector is commonly used in the generation of predictive error images of the brightness data and color difference data, although the present invention is not limited to such an example.

The intraframe time elapse management section 112 measures the time which has elapsed since the start of the encoding process for each frame and transmits the measured time to the motion detection time management section 113.

The motion detection time management section 113 allocates the motion vector detection time (search time) for each target macroblock.

Figure 2:
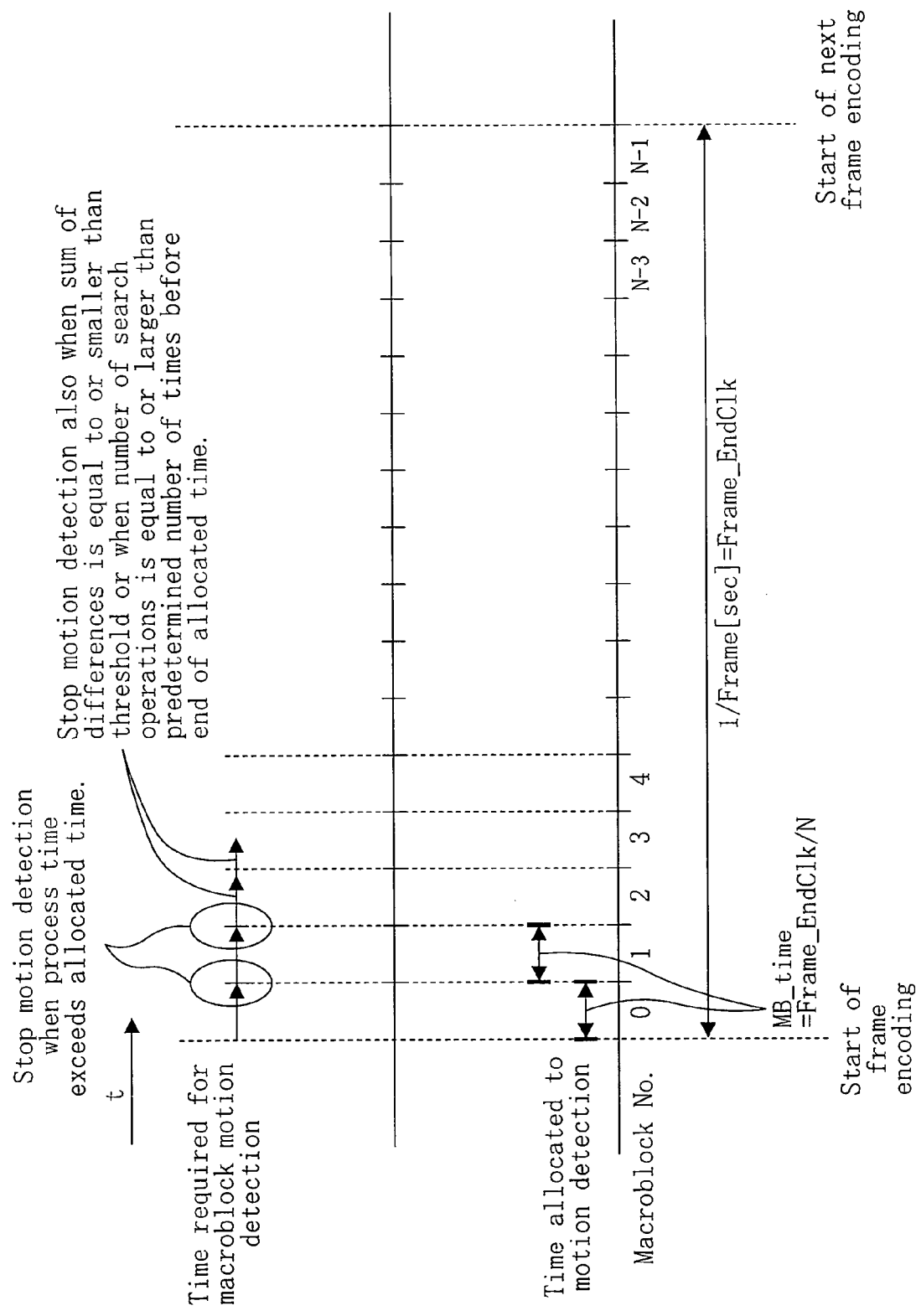
FIG. 2 illustrates the time allocation according to embodiment 1.
Figure 3:
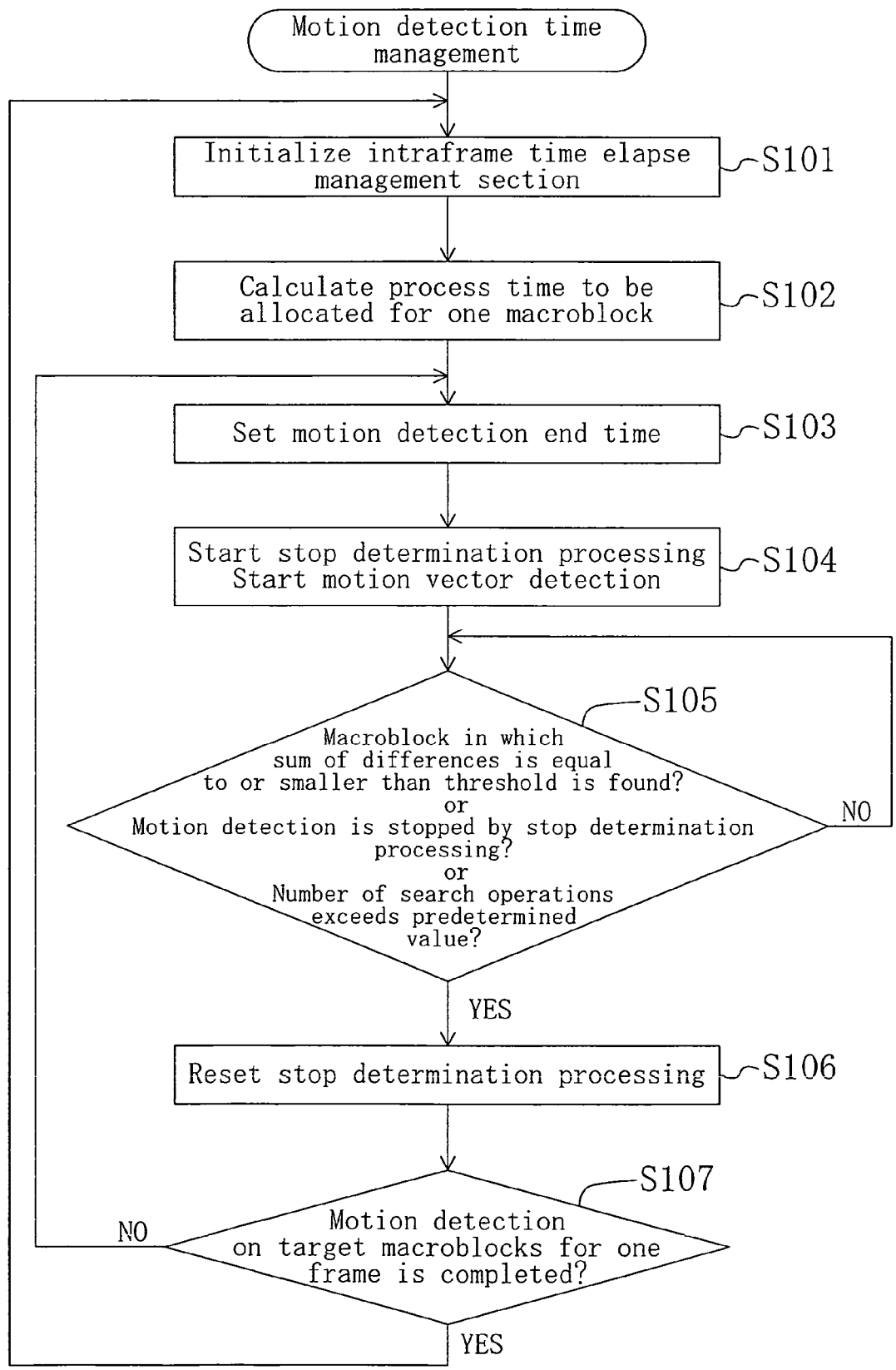
FIG. 3 is a flowchart illustrating the operation of the moving picture encoder device according to embodiment 1.

The encoding process itself performed in the moving picture encoder device having the above structure performs (generation of predictive error images, variable length encoding processing, etc.) is the same as that performed in a commonly-employed conventional moving picture encoder device. However, the search range of a macroblock in a reference frame, which is used for obtaining a motion vector, is controlled as described below. The search of macroblocks in a reference frame by the motion vector detection section 111 is stopped when the allocated time has elapsed, when the sum of the differences in pixels between a target macroblock and a macroblock in the reference frame is equal to or smaller than a predetermined threshold, or when the number of search operations of macroblocks in the reference frame exceeds a predetermined number of times as illustrated in FIG. 2. A specific operation is shown in FIG. 3.

(S101) Every time the motion vector detection processing for each frame is started, the intraframe time elapse management section 112 initializes an elapsed-time counter indicative of the time which has elapsed since the start of the processing, Frame_Clk [sec], and starts counting up the elapsed time.

(S102) The motion detection time management section 113 obtains the time within which the process of one frame is to be performed, Frame_EndClk [sec], and the time allocated to the process of one target macroblock, MB_time [sec], from externally-supplied frame rate Frame [fps] as shown below:

Frame_EndClk [sec]=1 [sec]/Frame [fps]

MB_time [sec]=Frame_EndClk [sec]/$N$ where N is the number of macroblocks which constitute one frame. Calculation of these values may be performed only once before the process of the first frame is started. Although in the above example, the time within which the process of one frame is to be performed (Frame_EndClk) is obtained for convenience of illustration, the time allocated to the target macroblock may be directly obtained as 1/(Frame×N).

(S103) Every time the motion vector detection process for each target macroblock is started, the time when the process is to be ended is obtained. Specifically, where a target macroblock is the kth macroblock in a certain frame (k=0, 1, . . . , N−1), motion vector detection end time MB_EndClk [sec] is updated as follows:

MB_EndClk [sec]=MB_time×(k+1)

Alternatively, instead of updating to the above value, MB_time may be added to the original end time (for the immediately previous macroblock) MB_EndClk. It is also possible that every time the motion vector detection process for each target macroblock is started, the elapsed-time counter is initialized, and it is determined whether or not the value of the elapsed-time counter has reached MB_time (to which surplus time for a previous target macroblock (if present) is added when necessary).

(S104) A request for the stop determination processing (for stopping the search operation when the predetermined allocated time has elapsed), which will be described later, is issued while the motion vector detection processing of the motion vector detection section 111 is started.

Specifically, in the first place, at least the brightness data of the pixel at a position corresponding to a target macroblock and the pixels of macroblocks neighboring the position are read from the reference image storage section 109 and stored in the motion search buffer 110. The motion vector detection section 111 obtains the sum of the differences between the brightness data of the pixels of the target macroblock which are stored in the input image buffer 101 and the brightness data of the pixels of the macroblock in the reference frame which are stored in the motion search buffer 110 and repeats this processing for other macroblocks in the reference frame till the sum becomes equal to or smaller than a predetermined threshold.

(S105) Determination as to whether or not the sum of the differences is equal to or smaller than the predetermined threshold value, whether or not the motion vector detection processing has been stopped by the stop determination processing, or whether or not the number of search operations (the number of times of comparing a target macroblock and a macroblock in a reference frame) has exceeded a predetermined number of times is performed mainly by, for example, the motion detection time management section 113. When any of the results of these determinations is true ("YES" at step 105), the search operation of the motion vector detection section 111 is stopped.

If the motion vector detection section 111 determines that the sum of the differences for a certain reference frame is equal to or smaller than the predetermined threshold, a macroblock in the reference frame is selected as a reference macroblock. Alternatively, if the motion vector detection processing has been stopped by the stop determination processing, or if the number of search operations has exceeded a predetermined number of times, a macroblock with which the sum of the differences exhibits the minimum value is selected as a reference macroblock. The relative position of the reference macroblock with respect to the target macroblock is obtained as a motion vector.

If the time required for searching (checking) one macroblock in the reference frame (calculation of the sum of the differences) is constant, the time required for the search is in proportion to the number of search operations, and accordingly, the control operation based on the search time is equivalent to the control operation based on the number of search operations. Thus, only any one of the stop determination processing based on the search time and the stop determination processing based on the number of search operations may be performed. That is, the control operation may be performed substantially based on the search time. Alternatively, if the time required for searching (checking) one macroblock in the reference frame is not constant, i.e., for example, when the number of pixels subjected to difference processing between the target macroblock and a macroblock in the reference macroblock changes (because of thinning) every search operation, the encoding process is completed within one frame cycle more surely and readily by the control operation based on the search time.

(S106) When the motion vector detection processing is stopped by any of the above operations, a request for resetting the stop determination processing is issued in the motion detection time management section 113.

(S107) It is determined whether or not the motion vector detection processing has been completed for all of the target macroblocks included in the target frame. If not completed, the processes of step S103 and the steps subsequent thereto are repeated. If completed, the processes of step S101 and the steps subsequent thereto are repeated.

Figure 4:
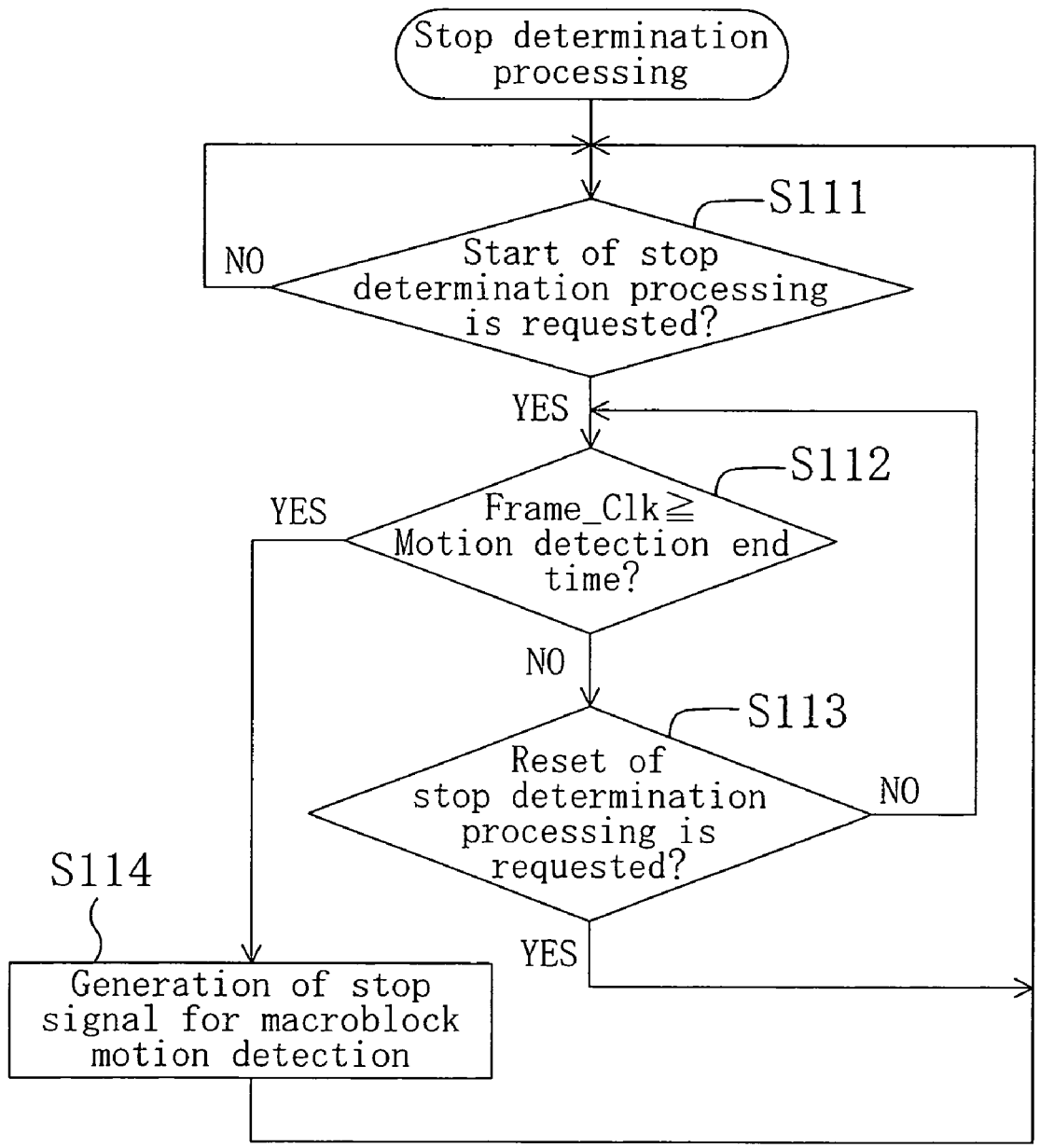
FIG. 4 is a flowchart illustrating the operation of the moving picture encoder device according to embodiment 1.

The stop determination processing is performed as illustrated in, for example, FIG. 4, in parallel to the processes of steps S101 to S107.

(S111) Determination as to whether or not a request for starting the stop determination processing has been issued at step S104 is repeated.

(S112 & S113) If the request for starting the stop determination processing has been issued, the motion detection time management section 113 refers to elapsed time Frame_Clk of the intraframe time elapse management section 112 to determine whether or not motion vector detection end time MB_EndClk has been passed. If end time MB_EndClk has not been passed, it is determined whether or not a request for resetting the stop determination processing has been issued at step S106. If the request has not been issued, the processes of step S112 and the steps subsequent thereto are repeated. If the request has been issued, the process returns to S111. When the sum of the differences is equal to or smaller than a predetermined threshold, or when the number of search operations exceeds a predetermined number of times, the search processing is stopped even if motion vector detection end time MB_EndClk has not been passed. Then, a request for starting the stop determination processing for the next target macroblock is waited for.

(S114) If motion vector detection end time MB_EndClk has been passed at step S112, the motion detection time management section 113 outputs a stop signal to the motion vector detection section 111. In this case, the motion vector detection section 111 selects a macroblock with which the previously-obtained sum of the differences is minimum as a reference macroblock. Herein, the relative position of the reference macroblock with respect to the target macroblock indicates a motion vector.

As described above, even if a reference macroblock with which the sum of the differences from the target macroblock is equal to or smaller than a predetermined threshold is not found, the encoding process for each frame is surely completed within a predetermined time period by stopping the search processing at the time when the allocated search time has elapsed, i.e., at the time when a predetermined end time is reached. If a reference macroblock which satisfies the above requirement is found within the allocated search time, the search processing for a subsequent target macroblock can be performed longer by the remainder time (or cumulative remainder time). Thus, the possibility of obtaining a more appropriate reference macroblock is increased.

Embodiment 2

In a moving picture encoder device described in embodiment 2, when the sum of the differences becomes equal to or smaller than a threshold within the allocated time, the remainder of the allocated time (remainder time) is re-allocated to the search for subsequent target macroblocks, whereby a more appropriate reference macroblock (having high similarity) is selected. In embodiment 2 and subsequent embodiments, it should be noted that the components having the similar functions to those described in embodiment 1 or other sections are denoted by like reference numerals, and therefore, descriptions thereof are herein omitted.

Figure 5:
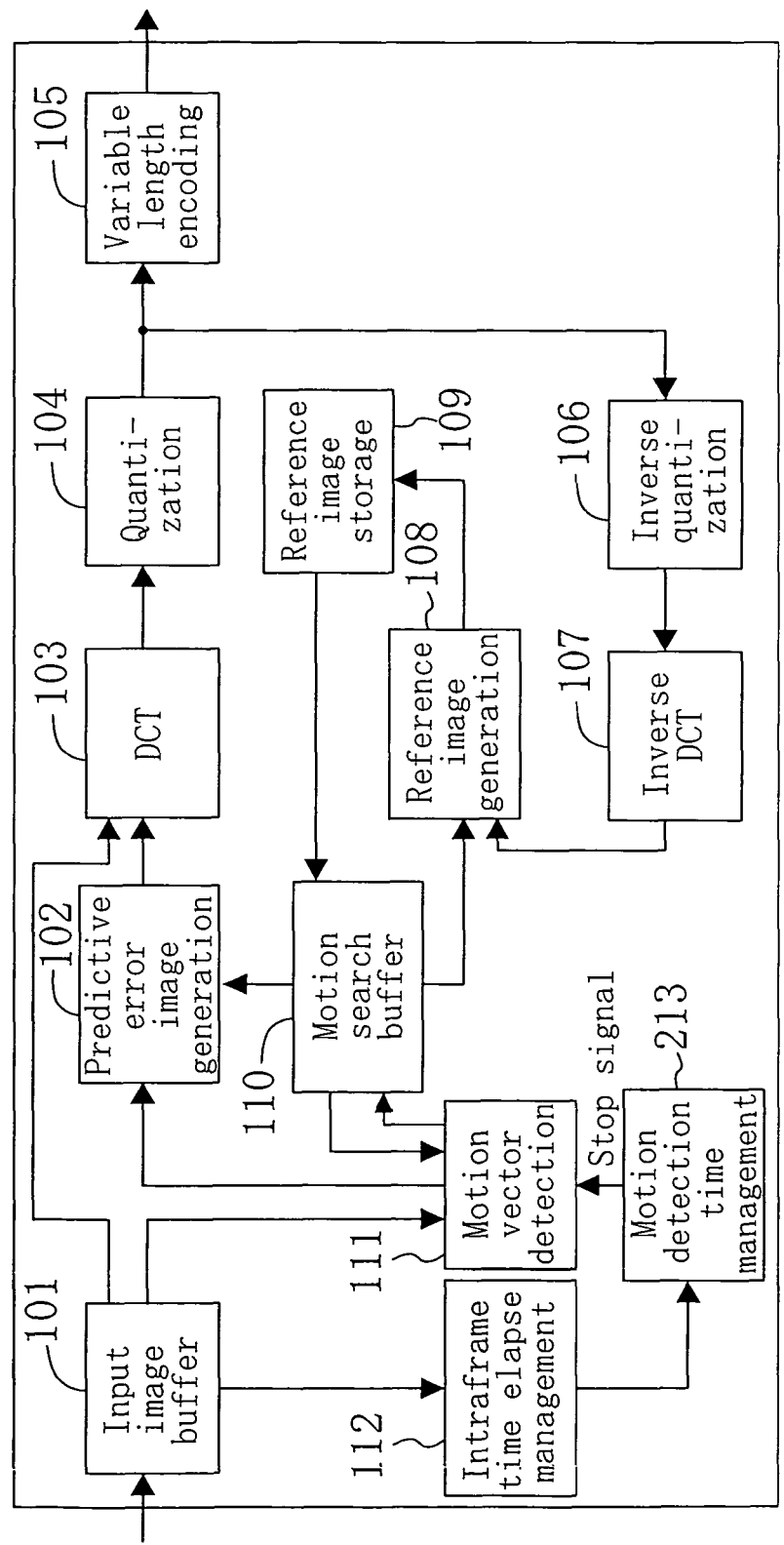
FIG. 5 is a block diagram showing the structure of a moving picture encoder device according to embodiment 2.

The moving picture encoder device of embodiment 2 shown in FIG. 5 is different from the moving picture encoder device of embodiment 1 (FIG. 1) in that the moving picture encoder device of embodiment 2 includes a motion detection time management section 213 in place of the motion detection time management section 113 of embodiment 1. When the motion vector detection processing for a target macroblock is completed before the end of an allocated time, the motion detection time management section 213 distributes the remainder time (difference between the allocated time and the actually-required time) to the motion vector detection processing for the other target macroblocks in the same frame.

Figure 6:
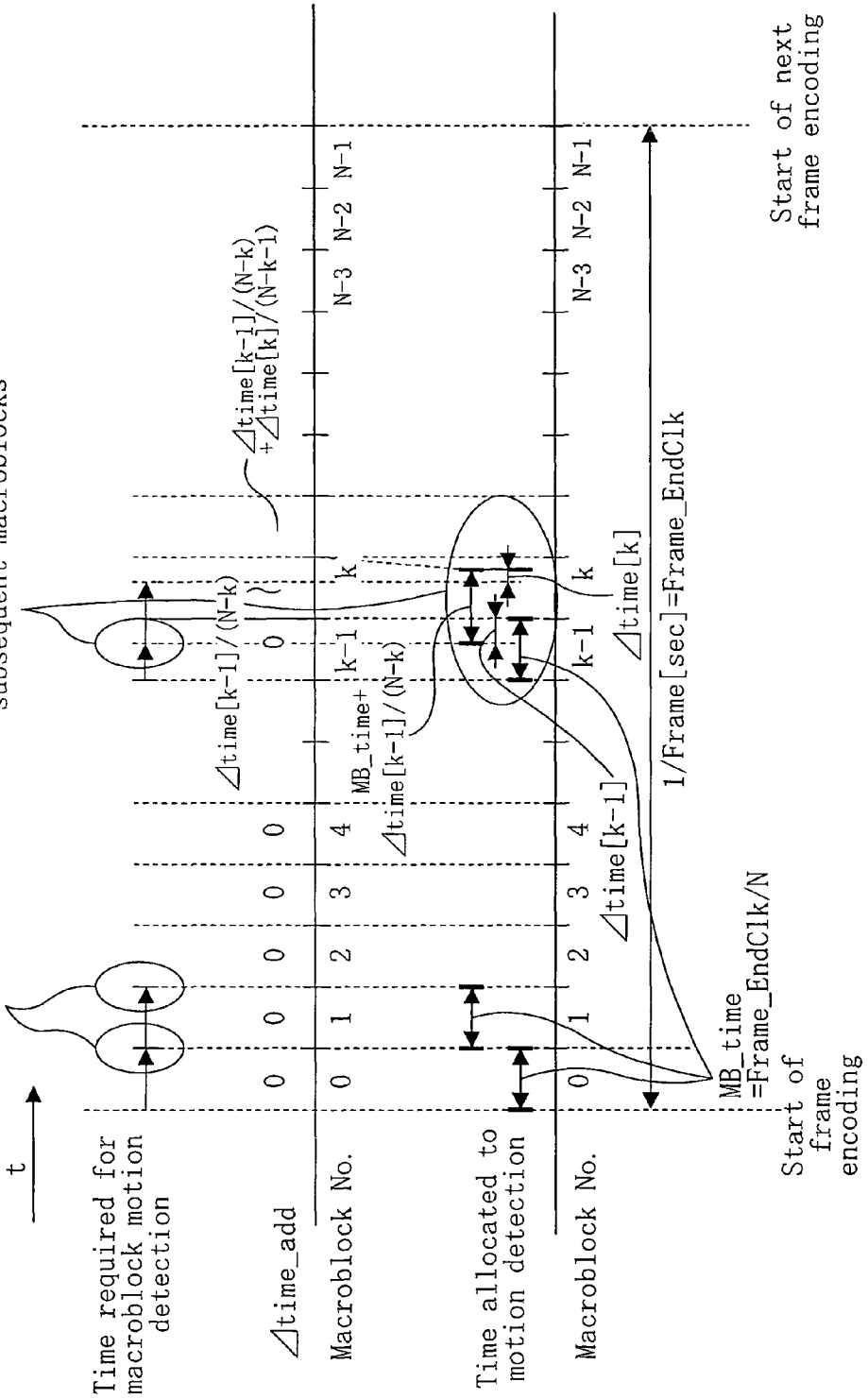
FIG. 6 illustrates the time allocation according to embodiment 2.

Specifically, consider a case where motion vector detection processing performed for the (k−1)th target macroblock is completed earlier than the time when the motion vector detection processing is to be completed according to an allocated time by remainder time Δtime [k−1] as shown in FIG. 6. In such a case, the time allocated to the kth target macroblock is the time which is to be allocated to the kth target macroblock with no consideration for the remainder time (MB_time) plus the time obtained by dividing remainder time Δtime[k−1] by the number of remaining target macroblocks ((N−1)−(k−1)=N−k), i.e., MB_time+Δtime [k−1]/(N−k). Herein, it is assumed that the remainder time does not occur in the macroblocks previous to the (k−1)th target macroblock. If the remainder time occurs two or more times, the time including an accumulated remainder time is allocated.

Figure 7:
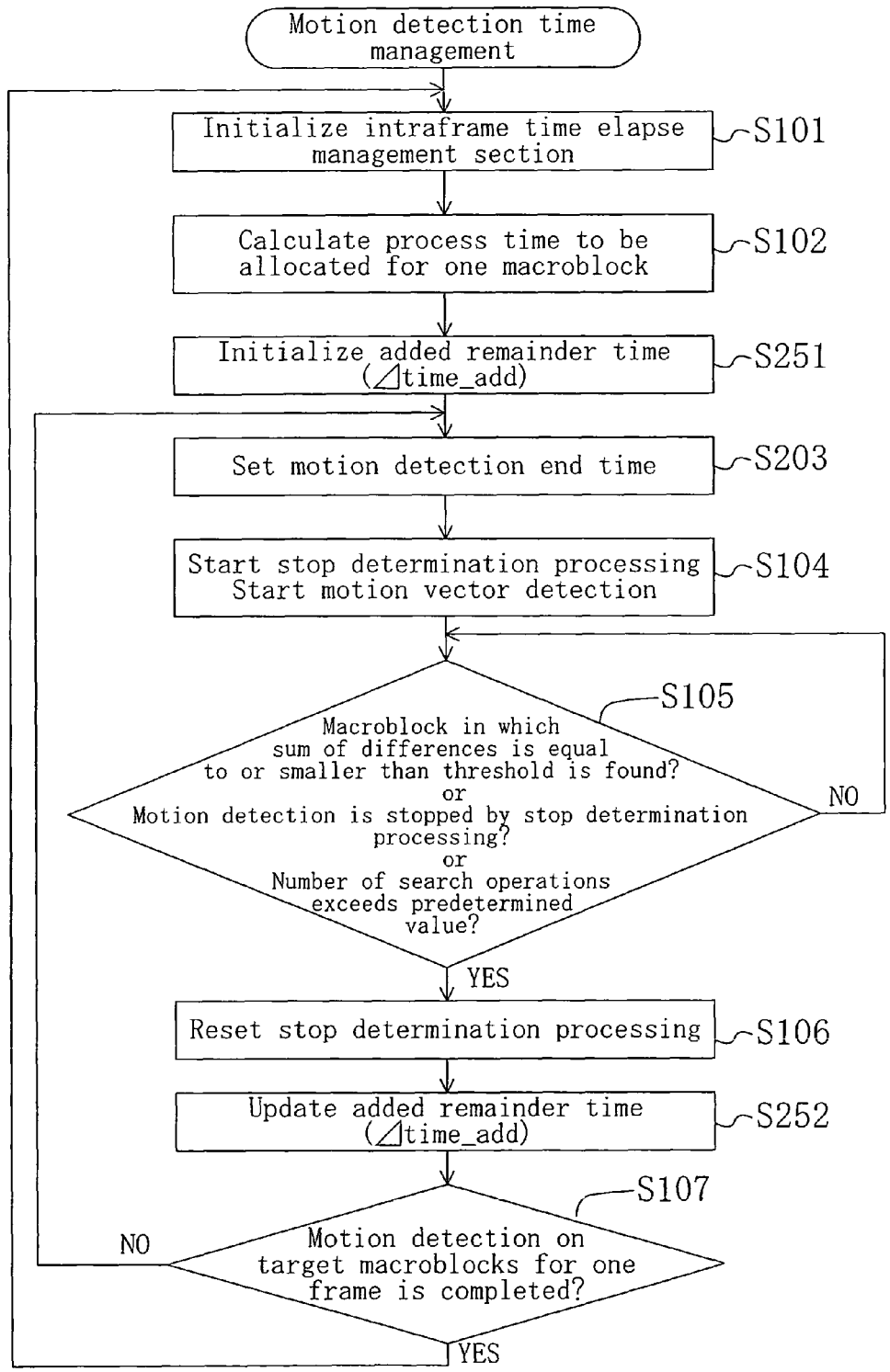
FIG. 7 is a flowchart illustrating the operation of the moving picture encoder device according to embodiment 2.

Specifically, the flow of embodiment 2 shown in FIG. 7 is different from that of embodiment 1 (FIG. 3) in that the process of step S203 is performed in place of the process of S103, and the processes of steps S251 and S252 are performed additionally. It should be noted that the stop determination processing is the same as that described in embodiment 1 (FIG. 4).

(S251) The value of added remainder time Δtime_add [0] before the process of the first target macroblock is started is initialized to 0.

(S203) Where as for the (k−1)th target macroblock, the time when the motion vector detection processing is to end according to the allocated time is MB_EndClk [k−1], the time which has elapsed until the actual end of the processing is Frame_Clk [k−1], and the added remainder time which is updated as will be described later is Δtime_add [k], the time when the motion vector detection processing of the kth target macroblock is to end, MB_EndClk [k], is set as follows:

MB_EndClk [k]=Frame_Clk [k−1]+MB_time+Δtime_add [k].

(S252) Where the time which has elapsed until the actual end of the processing on the kth target macroblock is Frame_Clk [k], remainder time Δtime [k] is as follows:

Δtime [k]=MB_EndClk [k]−Frame_Clk [k]

because the time when the motion vector detection processing is to end is MB_EndClk [k] as shown above. Accordingly, the added remainder time for the (k+1)th target macroblock, Δtime_add [k+1], is updated as follows:

Δtime_add [k+1]=Δtime_add [k]+Δtime [k]/(N−k−1)

That is, the total remainder time at the end of the motion vector detection processing on each target macroblock is equally distributed as the process time to the target macroblocks which are to be subsequently processed.

As described above, the search is stopped at the end of the allocated search time as in embodiment 1, whereby the encoding process for each frame is surely completed within a predetermined time period. In the case where the motion vector detection processing is completed before the end of the allocated search time, the remainder of the allocated time is distributed to the subsequent target macroblocks for their motion vector detection processing. Thus, the possibility of obtaining a more appropriate reference macroblock and high accuracy motion vector is increased.

Embodiment 3

In embodiment 2, examples of equal distribution of allocated time (standard allocation time) determined with no consideration of remainder time and equal distribution of the remainder time among target macroblocks have been described, but the present invention is not limited thereto. For example, time allocation may be determined according to the largeness of motion of images.

Figure 8:
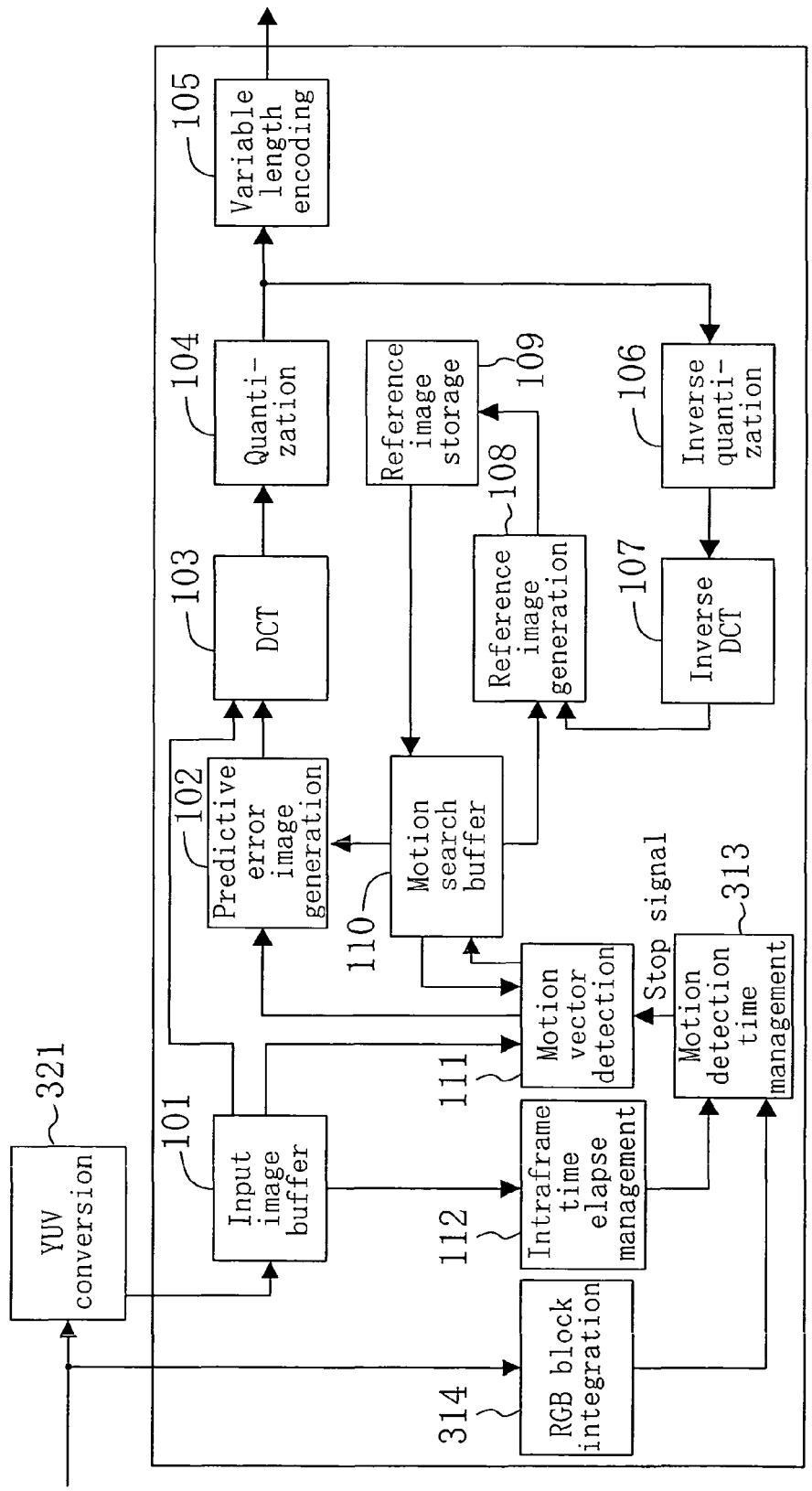
FIG. 8 is a block diagram showing the structure of a moving picture encoder device according to embodiment 3.

A moving picture encoder device of embodiment 3 shown in FIG. 8 is different from the moving picture encoder device of embodiment 1 (FIG. 1) in that the moving picture encoder device of embodiment 3 includes a motion detection time management section 313 in place of the motion detection time management section 113 and further includes a RGB block integration section 314.

The RGB block integration section 314 detects (estimates) the largeness of motion of an image based on R (red)-, G (green)- and B (blue)-data obtained before brightness data and color difference data which are to be stored in the input image buffer 101 are generated by a YUV conversion section 321. More specifically, R-, G- and B-data of all of the pixels which constitute each target macroblock are respectively summed (or averaged) on a target-macroblock by target-macroblock basis, for example, in a target frame. Assuming that the target frame is the nth frame of image data, for example, the sums of R-, G- and B-data, Rn, Gn and Bn, are obtained, and the absolute values of differences between Rn, Gn and Bn and the sums obtained from the previous frame (the (n−1)th frame) Rn−1, Gn−1 and Bn−1, i.e., the absolute values of differences, ΔR, ΔG, ΔB, are obtained as follows:

ΔR=Rn−1−Rn

ΔG=Gn−1−Gn

ΔB=Bn−1−Bn

It is determined whether or not all of (or at least two or at least one of) differences ΔR, ΔG and ΔB are greater than predetermined thresholds. A motion flag indicating that the motion of an image is (estimated to be) large is set on a target macroblock in which all of (or at least two or at least one of) differences AR, AG and AB are greater than predetermined thresholds.

Figure 9:
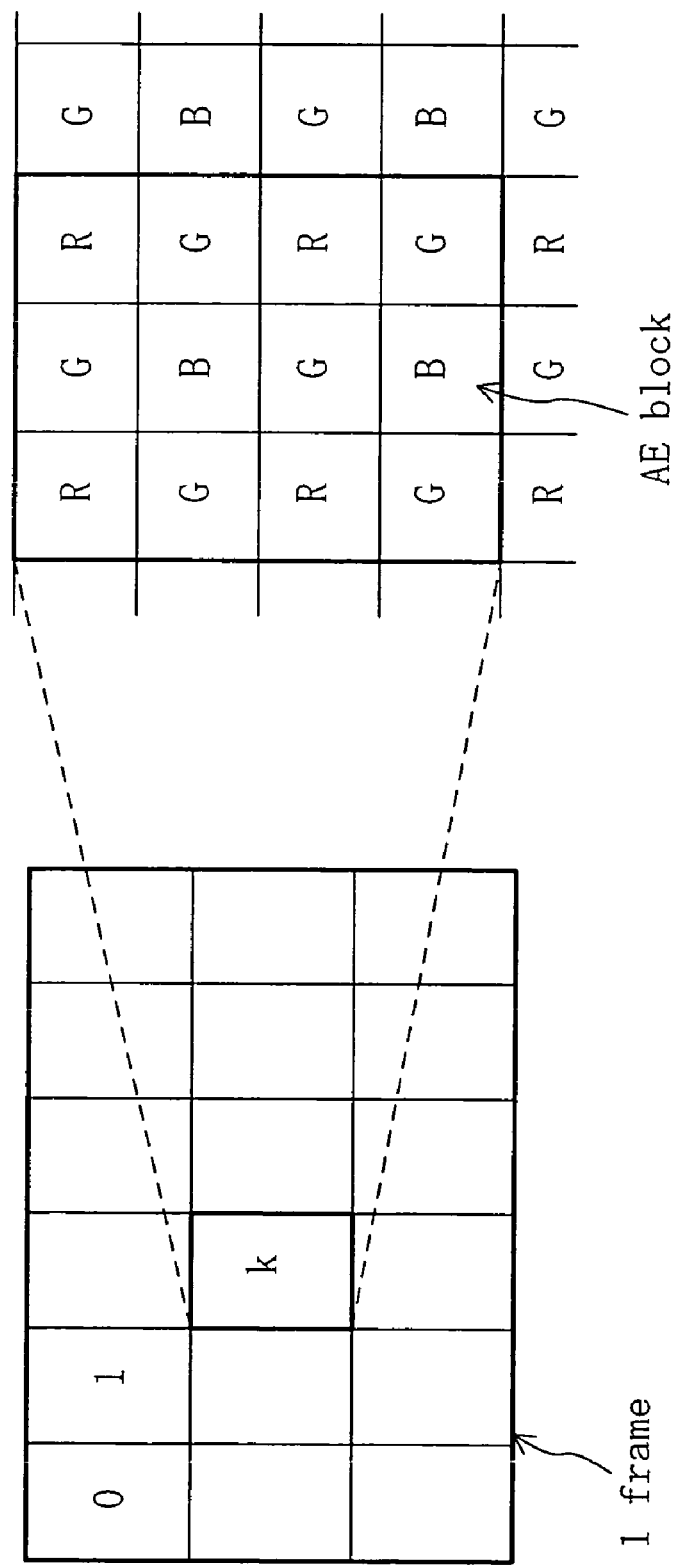
FIG. 9 shows an example of an AE block according to embodiment 3.

The sums of R-, G- and B-data are not limited to ones obtained for a target macroblock. Sums obtained for a pixel block which commonly shares some pixels with a target macroblock may be used as indexes of the largeness of motion. For example, the sums of R-, G- and B-data for one (or more) pixel block having predetermined size and shape which is generally obtained for automatic exposure control in digital cameras (AE block of color pixels arranged in the Bayer arrangement shown in FIG. 9) may be used. In such a case, it is not necessary to provide the RGB block integration section 314 exclusively for the moving picture encoder device, and therefore, the circuit scale is readily decreased.

The present invention is not limited to R-, G- and B-data. For example, the above operation may be performed based on image data, such as brightness data and color difference data converted by the YUV conversion section 321, or the like.

The motion detection time management section 313 distributes the standard allocation time and the remainder time to target macroblocks based on the motion flag, for example, as described below.

First, the standard allocation time is described. Where the time equally allocated to the target macroblocks is MB_time [sec] (=Frame_EndClk [sec]/N) as in embodiment 1 and the standard allocation time allocated to a target macroblock on which no motion flag is set and the standard allocation time allocated to a target macroblock on which a motion flag is set are MB_time_off and MB_time_on, respectively, the following relationships are satisfied:

MB_time_off=α×MB_time

MB_time_on={(1−α)(N−Nrgb)/Nrgb+1}×MB_time.

In these expressions, α is a predetermined constant (0<α<1), and Nrgb is the number of flagged macroblocks among N target macroblocks in a target frame.

Figure 10:
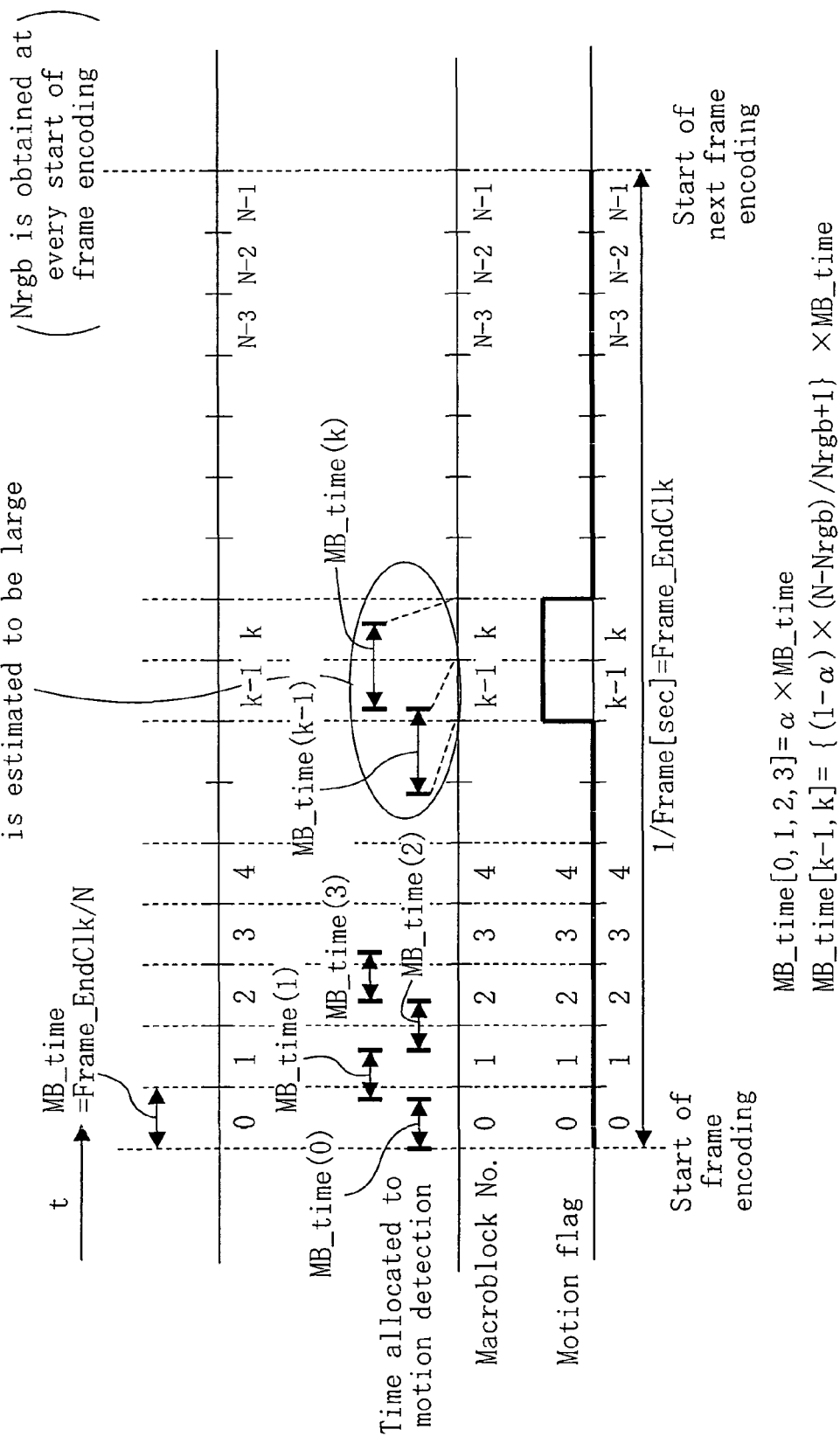
FIG. 10 illustrates the time allocation according to embodiment 3.

That is, as shown in FIG. 10, a time equal to a times the time equally allocated to all of the target macroblocks is allocated to a target macroblock on which no motion flag is set, while the remainder of the time is equally allocated to target macroblocks on which a motion flag is set.

Allocation of the remainder time is now described. Where the remainder time obtained when the motion vector detection processing on the (k−1)th target macroblock is completed is Δtime [k−1] as in embodiment 1 and the added remainder time allocated to the kth target macroblock on which no motion flag is set and the added remainder time allocated to the kth target macroblock on which a motion flag is set are Δtime_add_off [k] and Δtime_add_on [k], respectively, the following relationships are satisfied:

Δtime_add_off [k]=Δtime_add_off+β×Δtime/(N−k)

Δtime_add_on [k]=Δtime_add_on+Δtime×{1−β×(N−k−Nrgb_res)/(N−k)}/Nrgb_res

In these expressions, β is a predetermined constant (0<β<1), and Nrgb_res is the number of flagged macroblocks among N-k target macroblocks which have not yet undergone the motion vector detection processing.

In the same manner as for the standard allocation time, a time equal to β times the time equally allocated to all of the unprocessed target macroblocks is allocated to an unprocessed target macroblock on which no motion flag is set, while the remainder of the time is equally allocated to unprocessed target macroblocks on which a motion flag is set.

Where the time which has elapsed until the end of the motion vector detection processing on the (k−1)th target macroblock is Frame_Clk [k−1], the time when the processing on the kth target macroblock is to end, MB_EndClk [k], is set to:

MB_EndClk [k]=Frame_Clk [k−1]+MB_time_off+Δtime_add_off [k], in the case of a target macroblock on which no motion flag is set; and MB_EndClk [k]=Frame_Clk [k−1]+MB_time_on+Δtime_add_on [k], in the case of a target macroblock on which a motion flag is set.

Figure 11:
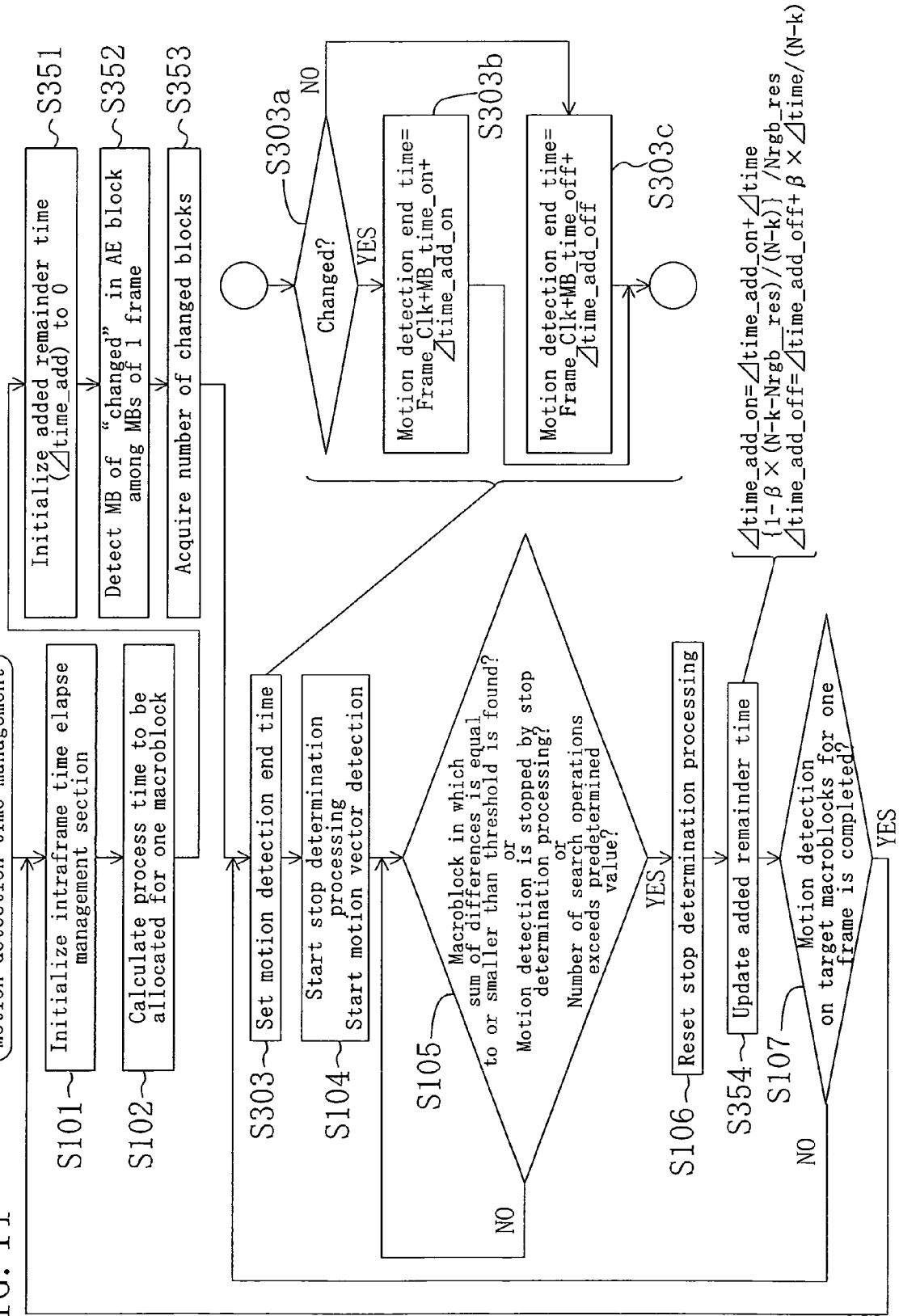
FIG. 11 is a flowchart illustrating the operation of the moving picture encoder device according to embodiment 3.

The details of the operation of the moving picture encoder device are as shown in FIG. 11. The operation of the moving picture encoder device of embodiment 3 is different from that of embodiment 2 (FIG. 7) in that the processes of steps S351 and S303 are performed instead of the processes of steps S251 and S203, the process of step S354 is performed instead of the process of step S252, and the processes of steps S352 and S353 are further performed. The stop determination processing is the same as that described in embodiment 1 (FIG. 4).

(S351) As in step S251 of embodiment 2, the values of added remainder time before the process of the first target macroblock is started, Δtime_add_off [0] and Δtime_add_on [0], are initialized to 0.

(S352) Differences of R-, G- and B-data between frames, AR, AG, AB, are obtained for each target macroblock, and a motion flag is set according to the largeness of the differences.

(S353) The number of target macroblock on which a motion flag is set (Nrgb) is counted.

(S303: S303a to S303c) The time when the motion vector detection processing is to end is set according to whether or not a motion flag for a target macroblock is set.

(S354) In the case where the motion vector detection processing is completed before the time when the motion vector detection processing is scheduled to end, added remainder time Δtime_add_off [k] and Δtime_add_on [k] are updated.

As described above, the time allocated to the motion vector detection processing is set according to the largeness of motion of an image. As for a target macroblock in which motion is estimated to be small, a reference macroblock is selected within a short period of time. As for a target macroblock in which motion is estimated to be large, the allocation time is set to be long, and the search is performed over a large area in a reference frame. Thus, the possibility of obtaining a more appropriate reference macroblock is increased.

In the above example, the largeness of motion of an image is estimated based on the differences of R-, G- and B-data between frames, ΔR, ΔG, ΔB, but the estimation method of the present invention is not limited thereto. The estimation method may be selected from various methods. For example, as for the values of one or more spatial frequency components obtained based on the R-, G- and B-data or brightness data, the absolute value of the difference between adjacent frames is obtained. When the absolute value is greater than a predetermined threshold, it is determined that the motion is large.

In the above example, the sums for an immediately-previous frame, Rn−1, Gn−1 and Bn−1, are stored in the RGB block integration section 314. However, according to the present invention, the image data stored in the reference image storage section 109 may be used instead.

The method for calculating the allocation time of the motion vector detection processing is not limited to those described above so long as the allocation time is set according to the largeness of motion of an image. Specifically, for example, the same value may be used as both constant α used for calculating the standard allocation time and constant β used for calculating the allocation time of the remainder time. Alternatively, any of these constants may be set to 1. (If both of these constants are set to 1, the operation is the same as that of embodiment 2.) Still alternatively, the ratio of allocated times between a macroblock on which a flag is set and a macroblock on which no flag is set may be set as a constant instead of using constants α and β.

The estimation of the largeness of motion is not limited to the binary estimation of "large" and "small". For example, the time to be allocated may be determined on a multi-level basis according to how many of differences AR, AG and AB is equal to or greater than a threshold(s), which of multi-level thresholds the differences AR, AG and AB are greater than, or the like.

Embodiment 4

According to the present invention, the standard allocation time and the remainder time may be allocated according to the value of a predetermined spatial frequency component instead of being allocated according to the largeness of motion of an image as in embodiment 3.

Figure 12:
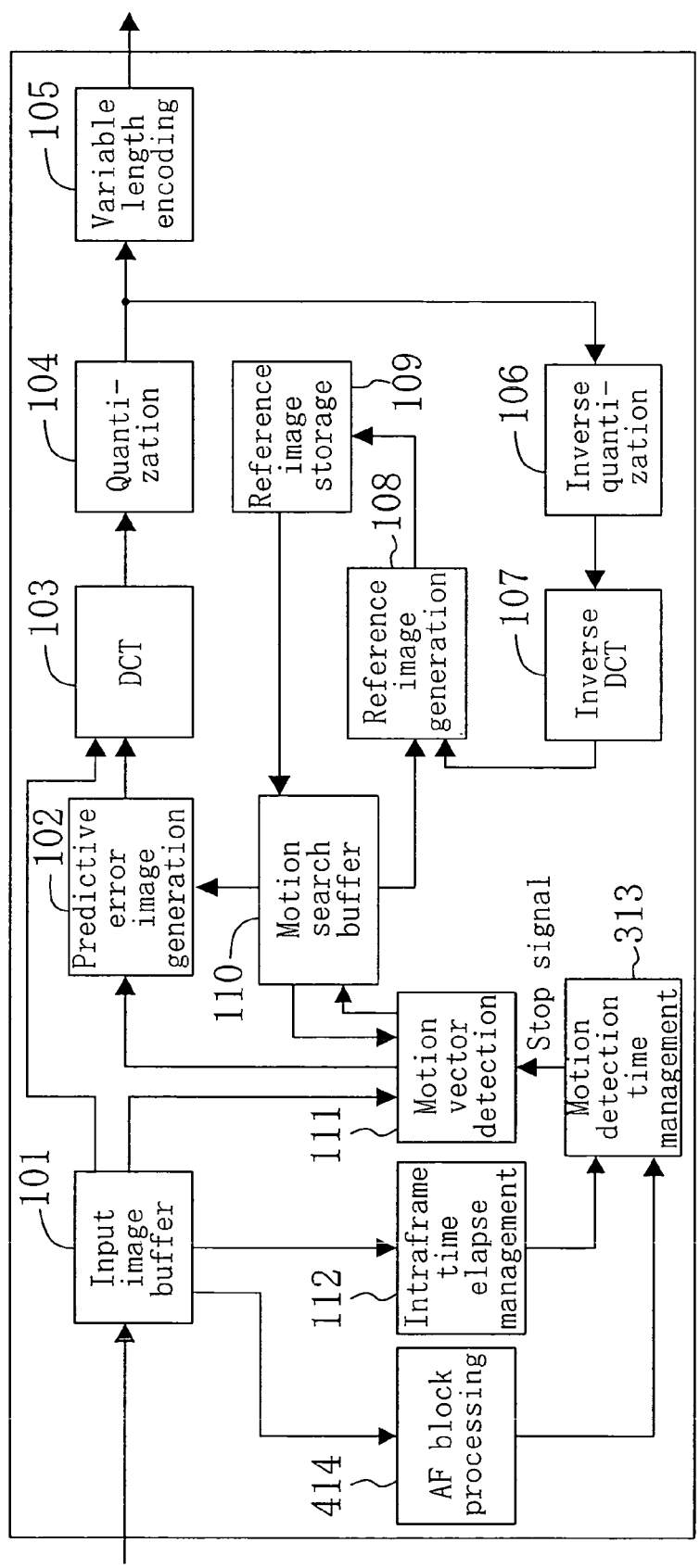
FIG. 12 is a block diagram showing the structure of a moving picture encoder device according to embodiment 4.
Figure 13:
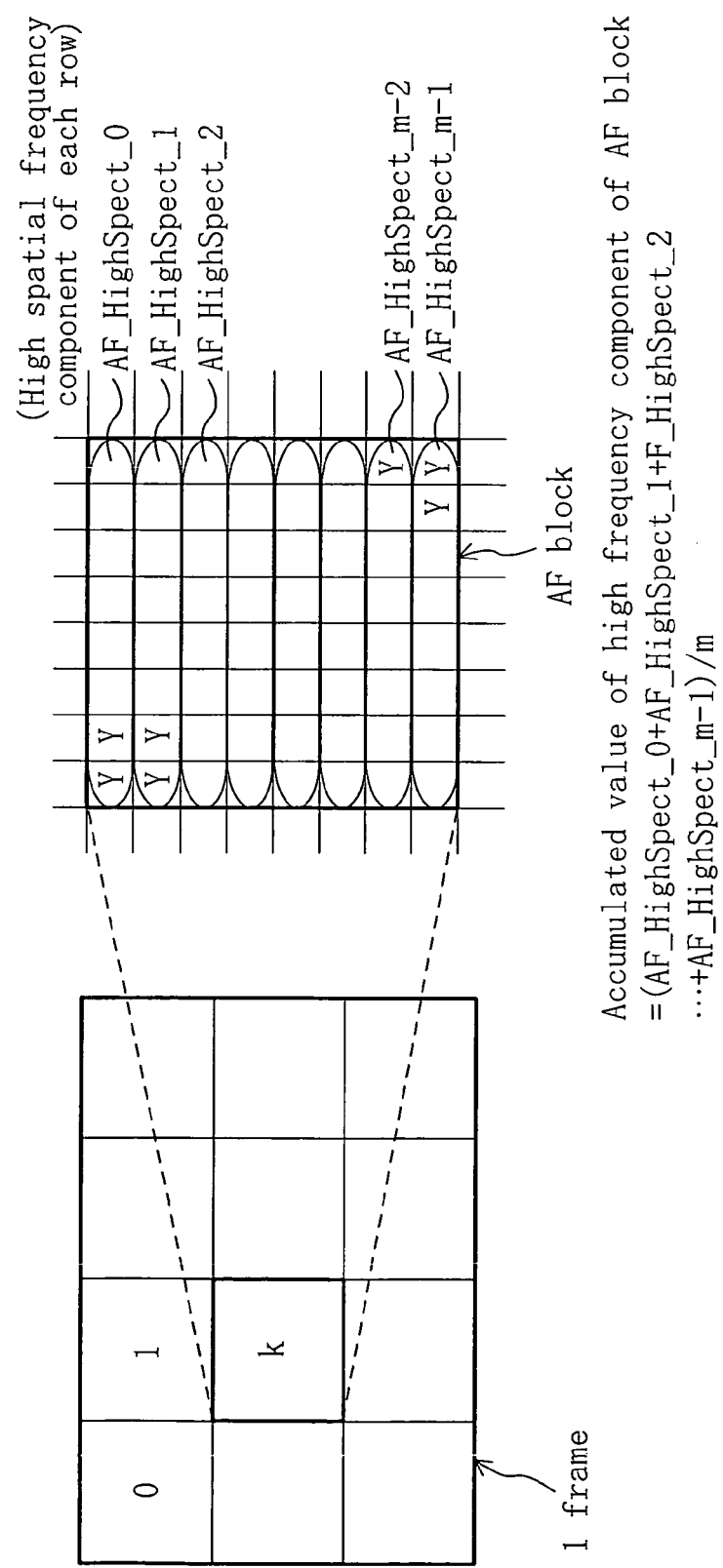
FIG. 13 shows an example of an AF block according to embodiment 4.

As shown in FIG. 12, the moving picture encoder device of embodiment 4 includes an AF block processing section 414 for determining the amount of a high spatial frequency component (e.g., at least a frequency component other than a direct-current component) based on the brightness data stored in the input image buffer 101. More specifically, the AF block processing section 414 determines a spatial frequency component for each horizontal row, for example, as for a pixel block (AF block) having a predetermined size and shape as shown in FIG. 13. If the sum of the amounts of high spatial frequency components equal to or higher than a predetermined frequency is equal to or greater than a predetermined threshold, a high frequency flag which indicates that the amount of a high spatial frequency component is large is set on a corresponding target macroblock (a target macroblock including some common pixels). Herein, the high spatial frequency component may be obtained for each target macroblock. However, alternatively, when the high spatial frequency component is obtained for an AF block which is generally used for automatic focusing in digital cameras, it is not necessary to provide the AF block processing section 414 exclusively for the moving picture encoder device as is the case with the RGB block integration section 314 described in embodiment 3. Therefore, the circuit scale is readily decreased.

The motion detection time management section 313 allocates a longer time to the motion vector detection processing of a target macroblock on which a high frequency flag is set than that of a target macroblock on which no high frequency flag is set as in embodiment 3. Specifically, in the expressions for determining the standard allocation time and the remainder time which are to be allocated to the target macroblocks in embodiment 3, the numbers of target macroblocks on which a high frequency flag is set, Naf and Naf_res, are used in place of the numbers of target macroblocks on which a motion flag is set, Nrgb and Nrgb_res.

The time of the motion vector detection processing is allocated as described above, whereby the possibility of selecting a more appropriate reference macroblock for a target macroblock having a large amount of high spatial frequency component is increased. Thus, according to embodiment 4, the amount of codes is readily decreased by decreasing the difference between the reference macroblock and each pixel data, although the amount of codes in a target macroblock having a high spatial frequency component is generally large. Further, as will be described later, in the case where a large quantization value is set to a target macroblock which has an amount of codes equal to or greater than a predetermined amount such that the amount of codes is reduced, the number of target macroblocks in which the amount of codes is reduced is decreased to suppress the deterioration of the picture quality.

Embodiment 5

The time of the motion vector detection processing may be allocated according to whether or not a target macroblock exists in a perimeter region of a frame. The significance of image data is usually higher in a central region than a perimeter region of a frame. Thus, a longer time is allocated to a target macroblock in the central region to increase the possibility of selecting an appropriate reference macroblock, whereby the deterioration of the picture quality is prevented. In general, the amount of codes allocated to one frame to be encoded is constant, or a reference code amount is predetermined. Thus, if the accuracy of the motion vector detection processing is low, the data amount of a predictive error image in the predictive error image generation section 102 becomes large, and the quantization value is set to a large value in the quantization section 104 such that the data amount is reduced to the reference code amount of one fame. As a result, the picture quality is likely to deteriorate. For example, a longer time is allocated to the central region to increase the accuracy of the motion vector detection processing such that the data amount of the predictive error image is decreased, whereby the deterioration of the picture quality in the central region is suppressed.

Figure 14:
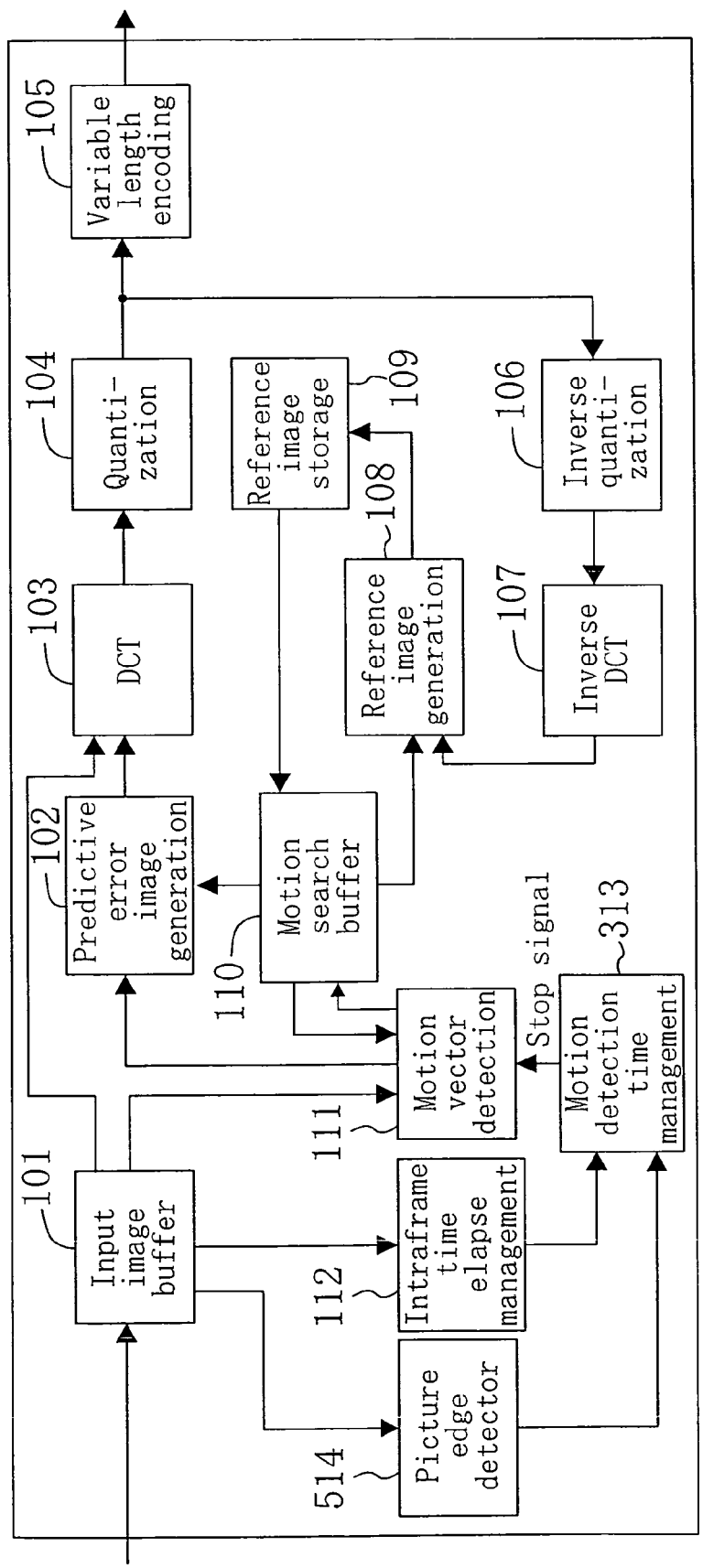
FIG. 14 is a block diagram showing the structure of a moving picture encoder device according to embodiment 5.

Specifically, as shown in FIG. 14, a picture edge detector 514 is provided in place of the RGB block integration section 314 of embodiment 3 (FIG. 8). The allocation time is calculated using the numbers of target macroblocks in the central region of a frame, Nc and Nc_res, are used in place of the numbers of target macroblocks in which motion is large as to the R-, G- and B-data, Nrgb and Nrgb_res. (As for the setting of constants α and β, it may be considered that the number of target macroblocks to be searched in a reference frame is smaller in the peripheral portion of the frame than in the central region of the frame.)

Figure 15:
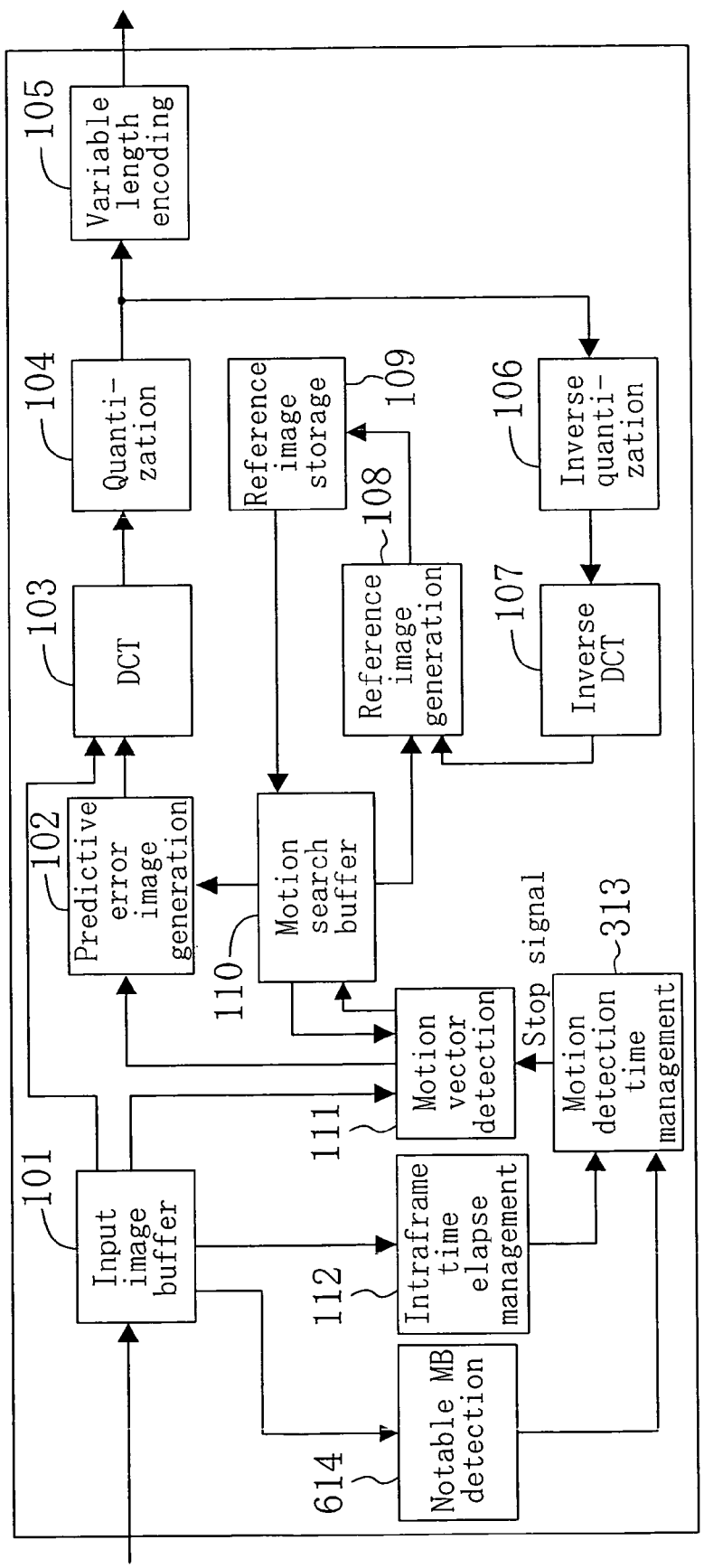
FIG. 15 is a block diagram showing the structure of an alternative example of the moving picture encoder device according to embodiment 5.

Alternatively, as shown in FIG. 15, a notable MB detection section 614 may be provided in place of the picture edge detector 514. With the notable MB detection section 614, a relatively long time is allocated to a target macroblock of high significance which exists in a notable area in a frame irrespective of whether the target macroblock is in a central region or a perimeter region. The allocation time is calculated using the numbers of target macroblocks which exist in a notable area, Nnotice and Nnotice_res.

Specifically, a macroblock which is determined by a skin color detection section used in a digital camera, for example, to have a color of skin is recognized by the notable MB detection section 614 as a part of an image of a human. The notable MB detection section 614 determines that the macroblock is a notable macroblock. In an alternative example, information indicating whether a macroblock corresponds to a highly-notable portion, e.g., a hallway area through which people pass, or the other area is set in or externally input to a fixed-view surveillance camera, and a notable macroblock is determined based on the information.

As described above, according to the present invention, an appropriate reference macroblock is readily selected, whereby the encoding efficiency is improved. Furthermore, the encoding process is surely completed within a predetermined time period. Thus, the present invention is useful for various moving picture encoder devices for transmitting, accumulating, or processing moving picture data.

What is claimed is:

1. A moving picture encoder device for encoding moving picture data, comprising:

a search unit for performing a search of a reference pixel block from among pixel blocks in a reference frame for each of target pixel blocks in a target frame, the reference pixel block having a sum of differences between corresponding pixel data smaller than a predetermined threshold, the reference pixel block being searched by comparing the sum of the differences of each of the pixel block in the reference frame with the predetermined threshold;

a search time setting unit for determining a specific time period which is assigned to each of the target pixel blocks for the search of a reference pixel block by the search unit; and a search time controlling unit for counting a time elapsing from beginning of the search of a reference pixel block as a time period consumed by the search and stopping the search at the time when the time period consumed by the search of the search unit reaches the specific time period, wherein:

when the search is stopped by the search time controlling unit, the search unit selects a pixel block with which the sum of the differences is minimum from among the previously searched pixel blocks as a reference pixel block of a search result, and when a reference pixel block with which the sum of the differences is smaller than the predetermined threshold is found before the end of the specific time period, the search unit stops the search for the reference pixel block and selects the reference pixel block as the reference pixel block of the search result for the target pixel block, and the search time setting unit allocates a difference between the specific time period and the time period consumed by the search of the reference block to a search as to another target pixel block.

2. The moving picture encoder device of claim 1, further comprising a motion prediction unit for predicting largeness of motion of an image on the target pixel block by target pixel block basis, wherein the search time setting unit sets the specific time for each target pixel block according to the predicted largeness of motion.

3. The moving picture encoder device of claim 2, wherein: the motion prediction unit obtains a difference between the sum of pixel data in a target pixel block or a motion prediction pixel block having a predetermined size which corresponds to the target pixel block and the sum of pixel data in a pixel block in a reference frame which resides at a position corresponding to the target pixel block or the motion prediction pixel block as a motion prediction value which indicates the largeness of the motion; and the search time setting unit sets a time assigned to a target pixel block in which the prediction value is large to be longer than that assigned to a target pixel block in which the prediction value is small.

4. The moving picture encoder device of claim 3, wherein the search time setting unit sets a time assigned to a target pixel block in which the motion prediction value is greater than a predetermined threshold to be longer than that assigned to a target pixel block in which the motion prediction value is smaller than the predetermined threshold.

5. The moving picture encoder device of claim 1, further comprising a spatial frequency component calculation unit for calculating the value of a predetermined spatial frequency component in each target pixel block or a spatial frequency component calculation pixel block having a predetermined size which corresponds to the target pixel block, wherein the search time setting unit sets an specific time which is to be assigned to each target pixel block according to the value of the predetermined spatial frequency component.

6. The moving picture encoder device of claim 5, wherein the search time setting unit sets a time assigned to a target pixel block in which the value of a predetermined high spatial frequency component is large to be longer than that assigned to a target pixel block in which the value of the predetermined high spatial frequency component is small.

7. The moving picture encoder device of claim 6, wherein the search time setting unit sets a time assigned to a target pixel block in which the value of the high spatial frequency component is greater than a predetermined threshold to be longer than that assigned to a target pixel block in which the value of the high spatial frequency component is smaller than the predetermined threshold.

8. The moving picture encoder device of claim 1, further comprising a pixel block position determination unit for determining a target pixel block of a perimeter portion and a target pixel block of a central portion in the target frame, wherein the search time setting unit sets a time assigned to the target pixel block of the central portion to be longer than that assigned to the target pixel block of the perimeter portion.

9. The moving picture encoder device of claim 1, further comprising a significance determination unit for determining significance of a target pixel block in a target frame, wherein the search time setting unit sets a time assigned to a target pixel block of higher significance to be longer than that assigned to a target pixel block of lower significance.

10. The moving picture encoder device of claim 1, wherein the search time setting unit allocates the difference between the specific time period and the time period consumed by the search to a search as to other target pixel blocks equally.

11. The moving picture encoder device of claim 1, wherein the search time setting unit allocates the difference between the specific time period and the time period consumed by the search to a search as to other target pixel blocks with weighting for some of the target pixel blocks.

12. The moving picture encoder device of claim 1, wherein the search time setting unit determines the specific time period based on a fixed time period and any allocated time period if the time setting unit allocates any time period.

13. A moving picture encoding method for encoding moving picture data, comprising:

a search step of performing a search of a reference pixel block from among pixel blocks in a reference frame for each of target pixel blocks in a target frame, the reference pixel block having a sum of differences between corresponding pixel data smaller than a predetermined threshold, the reference pixel block being searched by comparing the sum of the differences of each of the pixel block in the reference frame with the predetermined threshold;

a search time setting step of determining a specific time period which is assigned to each of the target pixel blocks for the search of a reference pixel block at the search step; and a search time controlling step of counting a time elapsing from beginning of the search of a reference pixel block as a time period consumed by the search and stopping the search at the time when the time period consumed by the search at the search step reaches the specific time period, wherein:

when the search is stopped at the search time controlling step, the search step performs the step of selecting a pixel block with which the sum of the differences is minimum from among the previously searched pixel blocks as a reference pixel block of a search result, and when a reference pixel block with which the sum of the differences is smaller than the predetermined threshold is found before the end of the specific time period, the search step performs the step of stopping the search for the reference pixel block and the step of selecting the reference pixel block as the reference pixel block of the search result for the target pixel block, and the search time setting step performs the step of allocating a difference between the specific time period and the time period consumed by the search of the reference block to a search as to another target pixel block.

14. The moving picture encoding method of claim 13, further comprising motion prediction step of predicting largeness of motion of an image on a target pixel block by target pixel block basis, wherein the search time setting step includes the step of setting the specific time for each target pixel block according to the predicted largeness of motion.

15. The moving picture encoding method of claim 14, wherein:

the motion prediction step includes the step of obtaining a difference between the sum of pixel data in a target pixel block or a motion prediction pixel block having a predetermined size which corresponds to the target pixel block and the sum of pixel data in a pixel block in a reference frame which resides at a position corresponding to the target pixel block or the motion prediction pixel block as a motion prediction value which indicates the largeness of the motion; and the search time setting step includes the step of setting a time assigned to a target pixel block in which the prediction value is large to be longer than that assigned to a target pixel block in which the prediction value is small.

16. The moving picture encoding method of claim 15, wherein the search time setting step includes the step of setting a time assigned to a target pixel block in which the motion prediction value is greater than a predetermined threshold to be longer than that assigned to a target pixel block in which the motion prediction value is smaller than the predetermined threshold.

17. The moving picture encoding method of claim 13, further comprising a spatial frequency component calculation step of calculating the value of a predetermined spatial frequency component in each target pixel block or a spatial frequency component calculation pixel block having a predetermined size which corresponds to the target pixel block, wherein the search time setting step includes the step of setting the specific time which is to be assigned to each target pixel block according to the value of the predetermined spatial frequency component.

18. The moving picture encoding method of claim 17, wherein the search time setting step includes the step of setting a time assigned to a target pixel block in which the value of a predetermined high spatial frequency component is large to be longer than that assigned to a target pixel block in which the value of the predetermined high spatial frequency component is small.

19. The moving picture encoding method of claim 18, wherein the search time setting step includes the step of setting a time assigned to a target pixel block in which the value of the high spatial frequency component is greater than a predetermined threshold to be longer than that assigned to a target pixel block in which the value of the high spatial frequency component is smaller than the predetermined threshold.

20. The moving picture encoding method of claim 13, further comprising a pixel block position determination step of determining a target pixel block of a perimeter portion and a target pixel block of a central portion in the target frame, wherein the search time setting step includes the step of setting a time assigned to the target pixel block of the central portion to be longer than that assigned to the target pixel block of the perimeter portion.

21. The moving picture encoding method of claim 13, further comprising a significance determination step of determining significance of a target pixel block in a target frame, wherein the search time setting step includes the step of setting a time assigned to a target pixel block of higher significance to be longer than that assigned to a target pixel block of lower significance.

* * * * *